US006199766B1

(12) United States Patent
Fox et al.

(10) Patent No.: US 6,199,766 B1
(45) Date of Patent: Mar. 13, 2001

(54) TARGETING OF FLYING INSECTS WITH INSECTICIDES AND APPARATUS FOR CHARGING LIQUIDS

(75) Inventors: Rodney Thomas Fox, Hull; Neale Mark Harrison, Burton-on-Trent; John Farrell Hughes, Southampton; Lindsey Faye Whitmore, Winchester, all of (GB)

(73) Assignees: University of Southampton, Southampton; Reckitt Benckiser (UK) Ltd., Windsor, both of (GB)

( * ) Notice: Subject to any disclaimer, the term of this patent is extended or adjusted under 35 U.S.C. 154(b) by 0 days.

(21) Appl. No.: 09/446,489

(22) PCT Filed: Jun. 29, 1998

(86) PCT No.: PCT/GB98/01898

§ 371 Date: Mar. 7, 2000

§ 102(e) Date: Mar. 7, 2000

(87) PCT Pub. No.: WO99/01227

PCT Pub. Date: Jan. 14, 1999

(30) Foreign Application Priority Data

| | | |
|---|---|---|
| Mar. 29, 1909 | (GB) | 9806133 |
| Jul. 4, 1997 | (GB) | 9714231 |
| Oct. 28, 1997 | (GB) | 9722611 |

(51) Int. Cl.[7] .......... A01G 23/10

(52) U.S. Cl. .......... 239/3; 239/690; 239/708; 239/337; 43/132.1

(58) Field of Search .......... 239/3, 690, 690.1, 239/708, 337; 43/132.1, 125, 129

(56) References Cited

U.S. PATENT DOCUMENTS

| | | | | |
|---|---|---|---|---|
| 4,776,515 | * | 10/1988 | Michalchik | 239/706 |
| 4,971,257 | * | 11/1990 | Birge | 239/708 |
| 5,490,633 | * | 2/1996 | Feffries et al. | 239/691 |
| 5,810,265 | | 9/1998 | Cornelius et al. | 239/690 |

FOREIGN PATENT DOCUMENTS

| | | | |
|---|---|---|---|
| 278 204 | 1/1952 | (CH) . | |
| 615322 | 5/1949 | (GB) . | |
| 1 482 732 | 5/1989 | (SU) | B05B/5/00 |
| WO90/10505 | 9/1990 | (WO) | B05D/1/02 |
| WO97/28883 | 8/1997 | (WO) | B01D/47/00 |

OTHER PUBLICATIONS

Copy of International Search Report for PCT/GB98/01898 dated Oct. 30, 1998.

Kleber W. et al.: "Triboelectrically charged powder coatings generated by running through holes and slits", Journal of Electrostatics, vol. 40–41, Jun. 1997, pp. 237–240.

Electrostatics: Principles, Problems and Applications by Jean Cross, Adam Hilger, Bristol, pp. 17–22.

Electrostatics: Principles, Problems and Applications by Jean Cross, Adam Hilger, Bristol, pp. 64–69.

* cited by examiner

*Primary Examiner*—Andres Kashnikow
*Assistant Examiner*—Dinh Q. Nguyen
(74) *Attorney, Agent, or Firm*—Fish & Richardson P.C.

(57) ABSTRACT

A method of killing flying insects which method comprises spraying into the air in which insects are flying liquid droplets of an insecticidal composition, a unipolar charge being imparted to the said liquid droplets by double layer charging and charge separation during spraying, the unipolar charge being at a level such that the said droplets have a charge to mass ratio of at least $+/-1\times10^{-4}$ C/kg. An aerosol spray device which is capable of imparting a unipolar charge by double layer charging and charge separation to liquid droplets of a composition sprayed therefrom has a spraying head in the form of an insert in an actuator, the spraying head having a bore through which liquid is expelled having an outlet, preferably with a tortuous periphery, having an L/a ratio of at least 8 (preferably at least 10) where L is the length of the periphery defining the bore outlet in mm and a is the cross-sectional area of the bore outlet in $mm^2$ and the apparatus being constructed such that the droplets are expelled from the spraying head at a flow ratio of at least 0.4 (preferably at least 0.5) grams per second and have a charge to mass ratio of at least $+/-1\times10^{-4}$ C/kg.

28 Claims, 15 Drawing Sheets

L = 1.7100
a = .166

L = 2.2740
a = .259

L = 1.6400
a = .1616

L = 2.2000
a = .2542

L = 3.7746
a = .4573

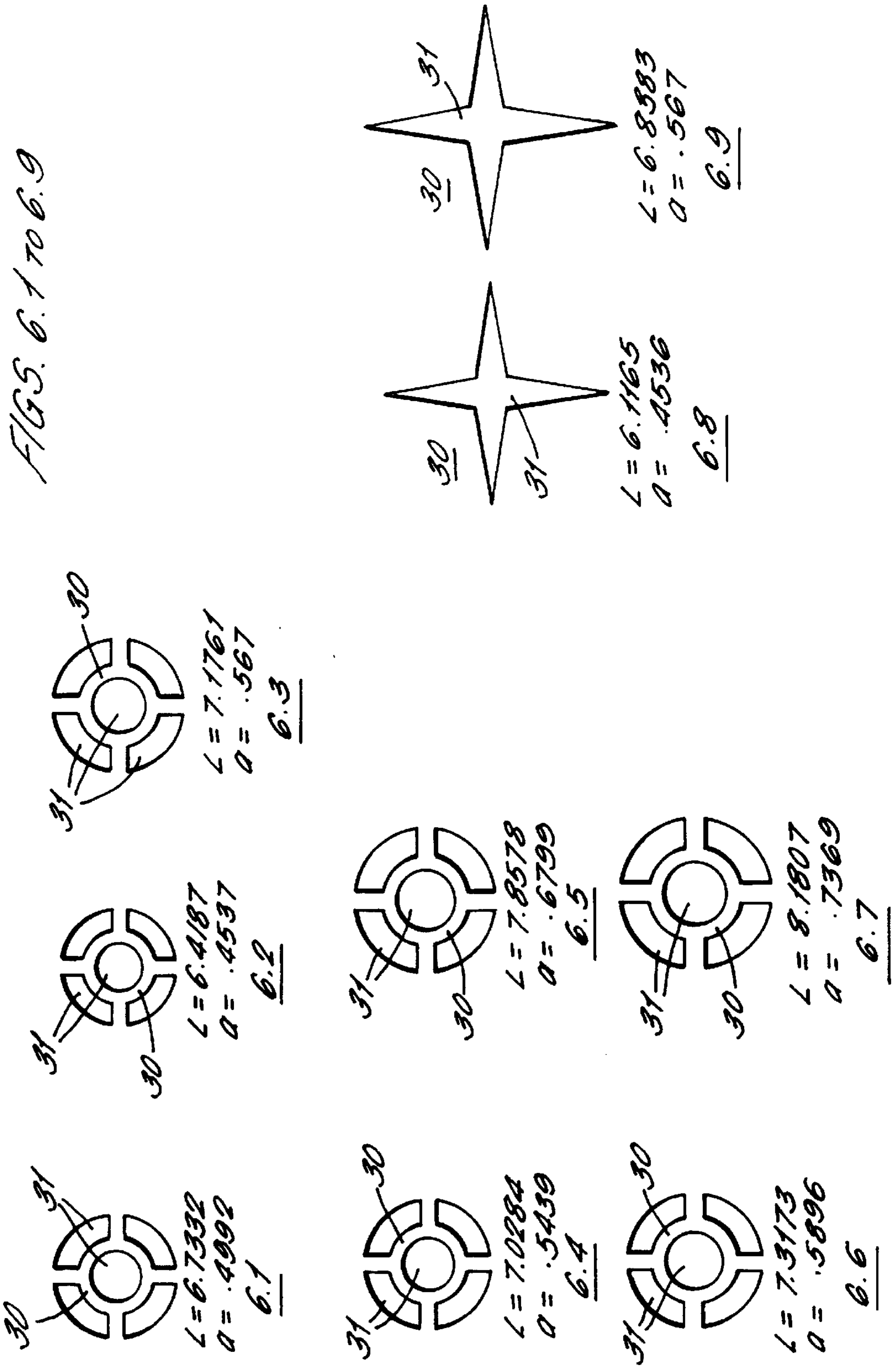
FIGS. 6.1 TO 6.9

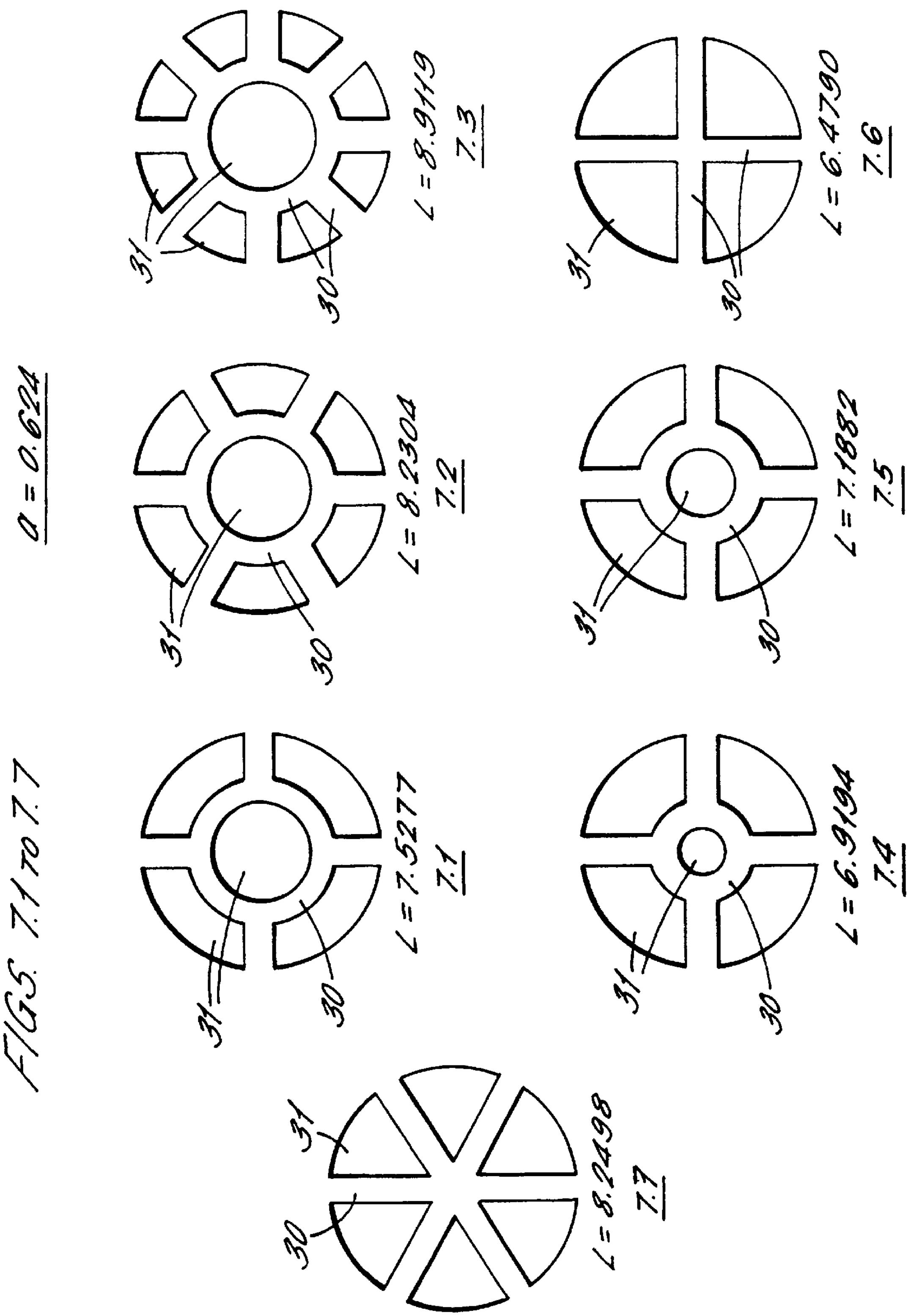
FIGS. 7.1 TO 7.7

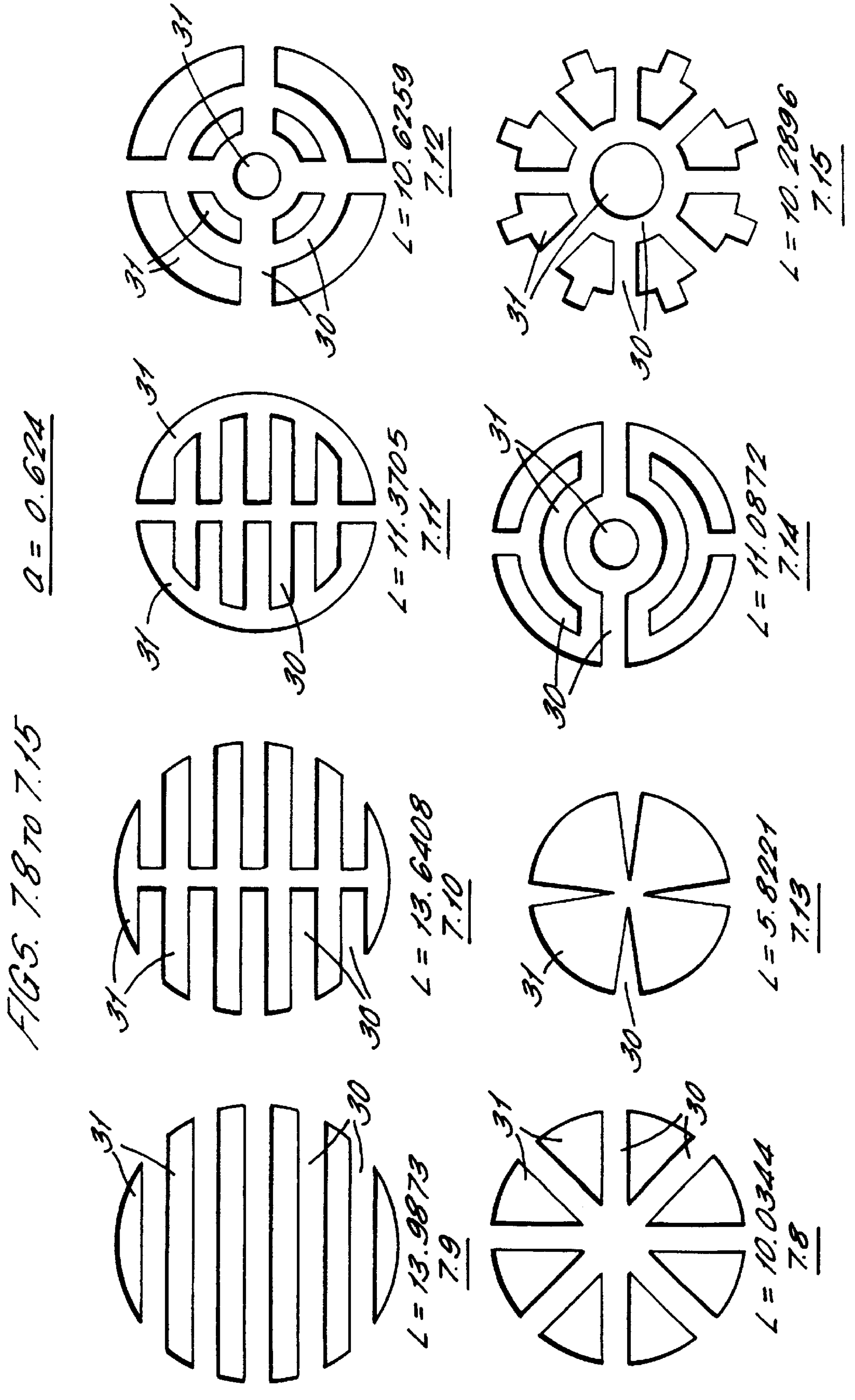
FIGS. 7.8 TO 7.15
a = 0.624
L = 13.9873
7.9
L = 10.0344
7.8
L = 13.6408
7.10
L = 5.8221
7.13
L = 11.3705
7.11
L = 11.0872
7.14
L = 10.6259
7.12
L = 10.2896
7.15
30
31

FIGS. 7.16 TO 7.23
a = 0.624
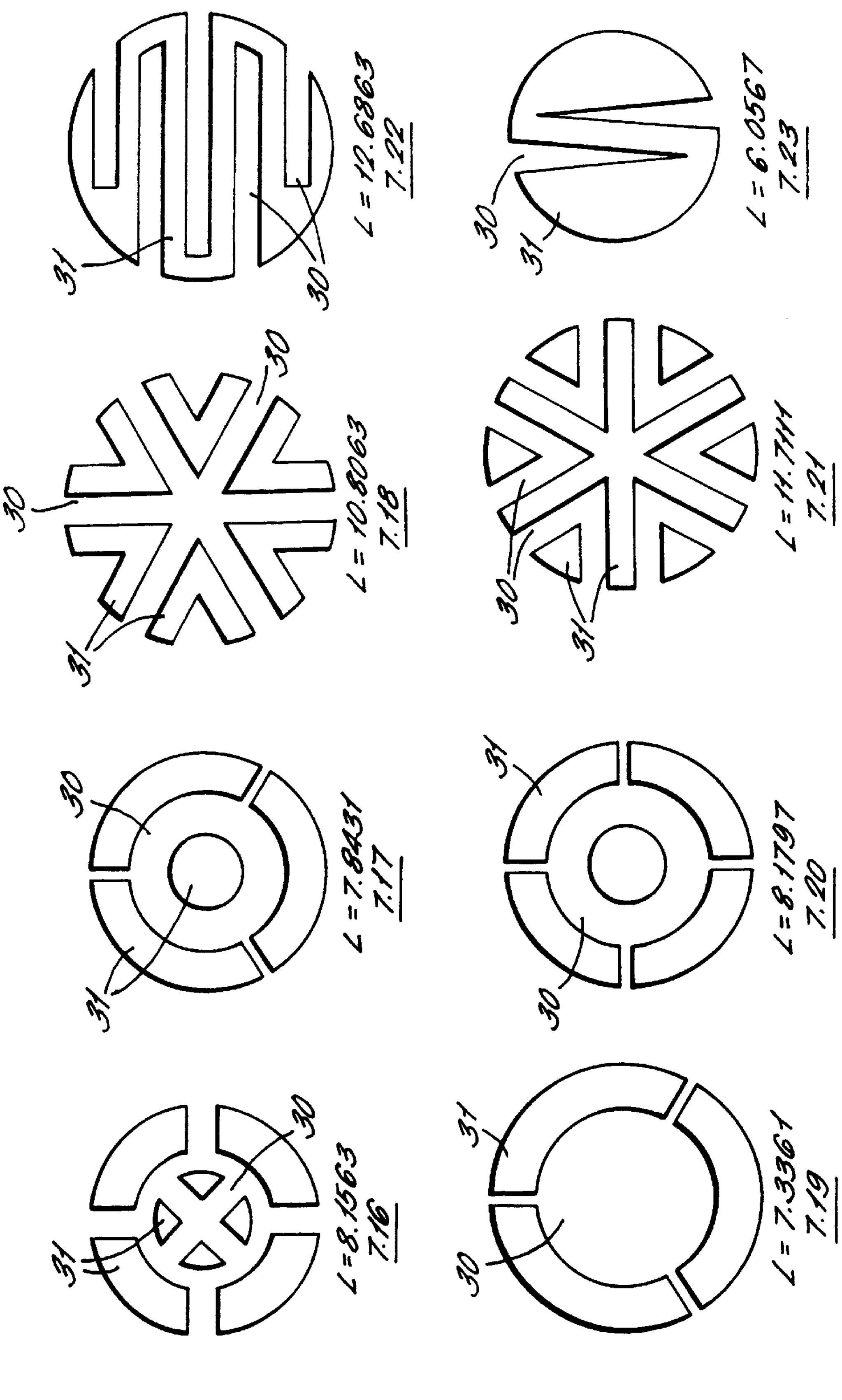

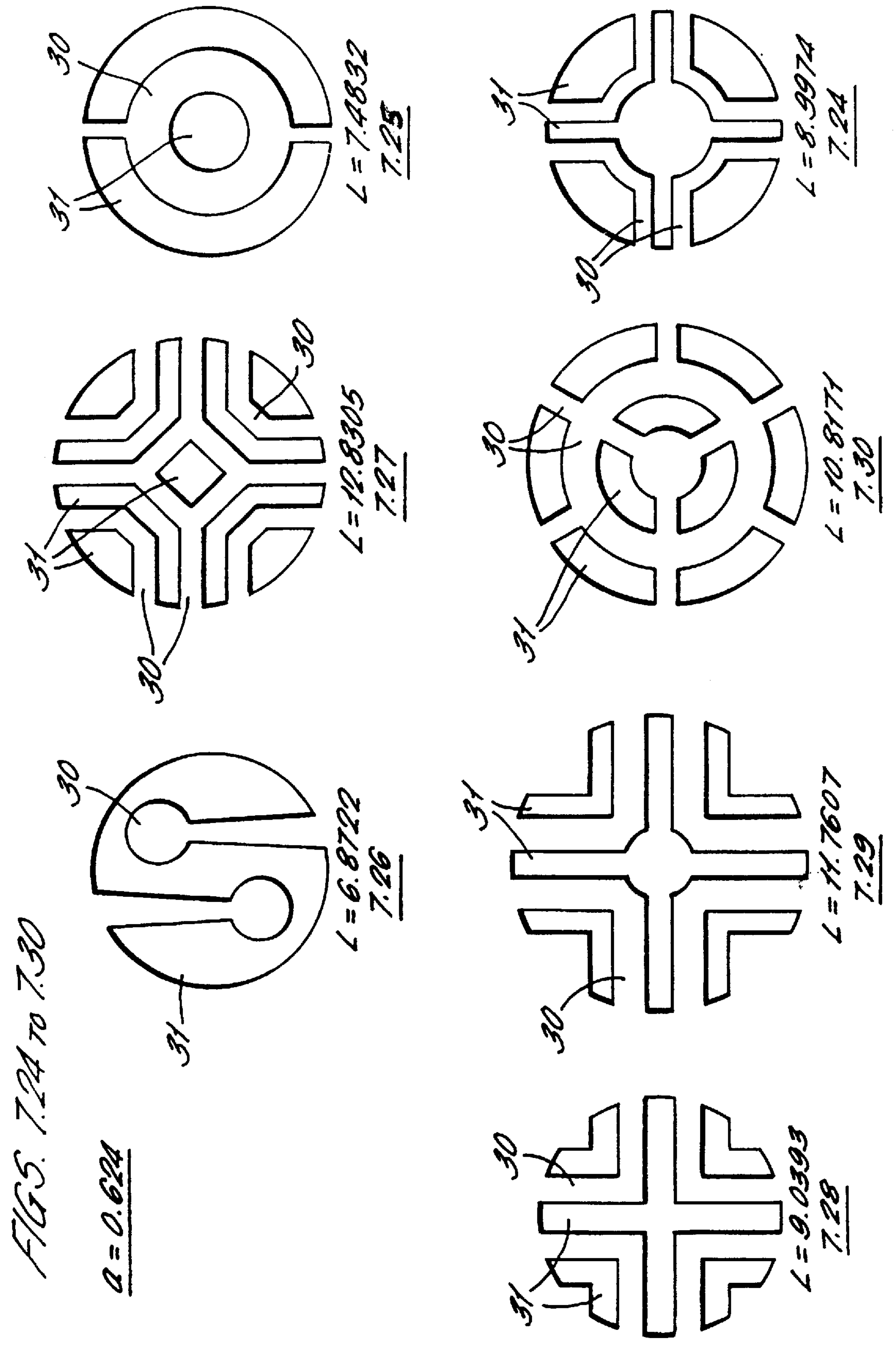
FIGS. 7.24 TO 7.30

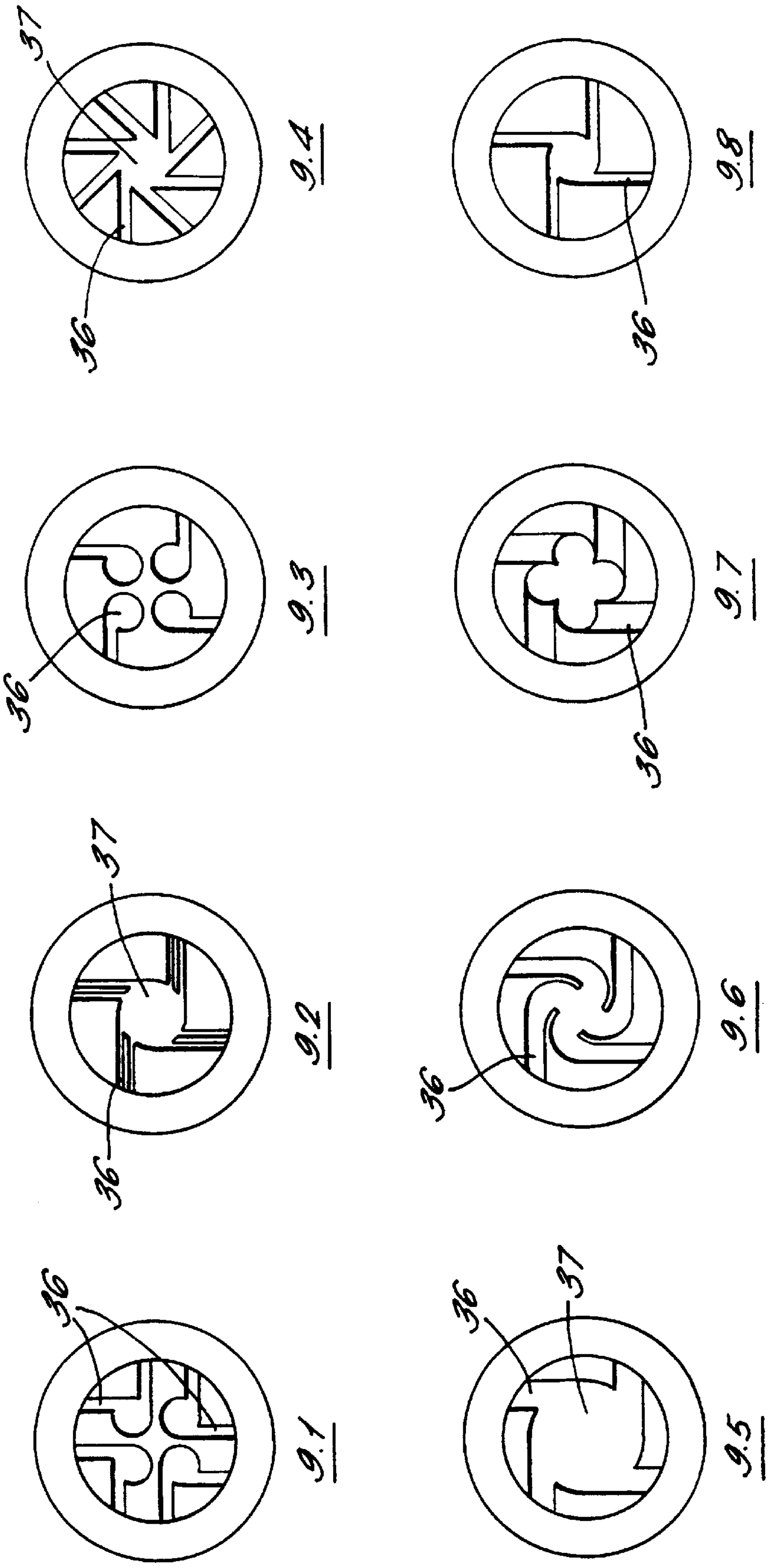
FIGS. 9.1 TO 9.8

TARGETING OF FLYING INSECTS WITH INSECTICIDES AND APPARATUS FOR CHARGING LIQUIDS

BACKGROUND OF THE INVENTION

The present invention relates to a method and apparatus for killing flying insects by spraying insecticide into the air in which the insects are flying, and in particular to methods of improving the targeting of the insects with the insecticide.

The efficiency of insecticide sprays in killing flying insects depends, in part, upon how much of the insecticide contacts the insects which are to be killed. Current methods of applying the insecticide rely on the mechanical interaction between the sprayed droplets of insecticide and each flying insect. Aerosol insecticide sprays may be dispersed into areas through which insects may fly and thus encounter the droplets of insecticide, or aerosol insecticide sprays may be aimed at specific target insects. Due to the high density of insecticide droplets in the plume produced during spraying, there is a high probability that contact will occur between the insects and the droplets. However, when insects are in flight the air disturbances around their bodies caused by the beating of wings may actually push droplets away. The probability of a flying insect coming into contact with one or more aerosol insecticide droplets is thus largely determined by mechanical forces, whilst the probability of knock-down or kill is subsequently determined by the concentration and toxicity of the active ingredient in the insecticide being used.

Spraying apparatus for producing a spray of liquid droplets is well known. For example, such apparatus is known in the domestic environment for producing sprays of droplets of insecticides or polish or air freshening compositions. Generally, such apparatus includes a reservoir for accommodating the liquid composition to be sprayed, a spraying head including a bore through which the composition is expelled in the form of a spray of droplets, and a conduit system whereby the composition can pass from the reservoir to the spraying head. The apparatus may preferably be in the form of an aerosol in which case it includes gas under pressure, possibly in a liquid state, which expels the liquid composition (to be sprayed) from the reservoir to the spraying head and then out of the spraying head in the form of a spray of droplets.

Generally, the droplets leaving the spraying head have a small electrostatic charge created by electron transfer between the liquid and the walls of the apparatus. We have realised that it is necessary to increase the level of charge on the droplets significantly to enable electrostatic attraction to insects and to other objects to occur, thereby enabling enhanced targeting by the spray and also allowing greater dispersion of the droplets in the air.

Further, we have found that components of the apparatus in contact with the liquid have the ability to influence the charge given to the liquid as it is being sprayed. More particularly it has been found that the charge on the droplets increases with an increase in the contact area between the liquid and the bore-defining portions of the spraying head.

SUMMARY AND DISCLOSURE OF THE INVENTION

Accordingly, in one aspect the present invention provides a method of killing flying insects which method comprises spraying into the air in which the insects are flying liquid droplets of an insecticidal composition, a unipolar charge being imparted to the said liquid droplets by double layer charging and charge separation during spraying, the unipolar charge being at a level such that the said droplets have a charge to mass ratio of at least $+/-1\times10^{-4}$ C/kg The effect of the charging of the droplets will be to generate an electrical field resulting in the diffusion of the droplets more widely within the space into which they are sprayed.

Flying insects are usually electrically isolated from their surroundings and may be at a potential equal to their surroundings. However, some insects are electrically charged so that they may be at a potential different from their surroundings. In either situation, an isolated insect within a cloud of electrically charged liquid droplets is likely to cause a distortion in the configuration of the electrical field generated by the droplets so that the attraction of the droplets onto each insect will be improved. This amounts to the targeting of each insect.

This improvement in the interaction between the charged droplets and the insects will be due to the combined effect of the additional diffusion forces generated within the charged cloud of droplets by the electrical field leading to modification of the trajectory of each droplet so that each droplet is directed to an insect. The insecticide is attracted to the whole surface of each insect. This improves the targeting of the insecticidal droplets onto the insects.

Insects which can suitably be killed according to the present invention include house flies, mosquitoes, and wasps.

The liquid droplets have a charge to mass ratio of at least $+/-1\times10^{-4}$ C/kg. The higher the charge to mass ratio of the liquid droplets the more pronounced the interaction with the insects.

The liquid insecticidal composition which is sprayed into the air is preferably a water and hydrocarbon mixture, an emulsion, or a liquid which is converted into an emulsion by shaking the spraying device before use, or during the spraying process. The insecticidal composition is preferably sprayed from an aerosol spray device which is mechanically operated under pressure. More preferably the spray device is a domestic aerosol spray can which is of a size suitable to be used easily with one hand.

Whilst all liquid aerosols are known to carry a net negative or positive charge as a result of double layer charging, or the fragmentation of liquid droplets, the charge imparted to droplets of liquids sprayed from standard aerosol spray devices is such as to give a charge to mass ratio of only of the order of $+/-1\times10^{-8}$ to $1\times10^{-5}$ C/kg.

The invention further relies in one embodiment thereof on combining various characteristics of the spray device in order to maximise the charging of the liquid droplets as they are sprayed from the aerosol spray device. The optimum combination varies for each formulation which is to be sprayed from the device.

Accordingly, in a further aspect the present invention provides a spray device which is capable of imparting by double layer charging and charge separation to liquid droplets of a composition sprayed therefrom a unipolar charge resulting in a charge to mass ratio of at least $+/-1\times10^{-4}$ C/kg, which spray device comprises:

(i) a reservoir for accommodating the liquid composition, (ii) a spraying head through which the liquid is expelled in the form of a spray of droplets, and (iii) a conduit system for feeding the composition from the reservoir to the spraying head wherein a) the spraying head has a bore through which the liquid is expelled from the apparatus, the bore having an L/a ratio of at least 10, more preferably at least 12, where L is the length of the periphery defining the bore outlet in mm and a is the cross sectional area of the bore outlet in $mm^2$; and b) the apparatus is constructed such that the droplets are expelled from the spraying head at a flow rate of at least 0.5 grams per second and have a charge/mass ratio of at least $+/-1\times10^{-4}$ C/kg.

The spraying head is preferably in the form of an insert in an actuator through which the liquid is expelled in the form of a spray of droplets.

For the avoidance of doubt, the bore outlet is the end of the bore through which the liquid is expelled in the form of a spray from the apparatus, and may also be termed an orifice.

The electrostatic charge on the droplets may be either a positive charge or a negative charge.

Whilst it is known that reducing the cross sectional area of a circular orifice through which a liquid is sprayed will increase the charge on the liquid sprayed through the orifice, in order to achieve the charge required by the present invention it would be necessary to reduce the cross sectional area of the orifice to such an extent that the spray rate would decrease. In putting the invention into practice the spray rate is maintained at about 0.5 grams per second. For a circular orifice, this spray rate can only be achieved at the same time as achieving the charge required by the present invention by using propellant at a much higher pressure than that which is normally used in spray devices, i.e. typically 40 psi. Preferably, however, orifices which have a tortuous periphery are used whilst maintaining a large cross sectional area. In this manner, the spray rate can be maintained at above 0.5 grams per second using propellant pressures normally used in spray devices.

The periphery of the bore outlet is thus preferably tortuous and the flow of the liquid over the tortuous surface assists in the liquid becoming charged by double layer charging.

Accordingly, using a bore with a tortuous periphery, the L/a ratio may be reduced to at least 8 and the apparatus is constructed such that the droplets are expelled from the spraying head at a flow rate of at least 0.4 grams per second.

The spraying device of the present invention is preferably an aerosol spray device which includes a gas under pressure, for example liquefied petroleum gas e.g. butane and/or propane (LPG), in the reservoir. The spraying head of the device forms part of an actuator, operable by the user, of a valve assembly to cause the liquid in the reservoir to be expelled from the spraying head in the form of droplets. Thus, by moving the actuator from a first rest position to a second actuating position, the pressure in the reservoir is released and the gas forces the liquid from the reservoir, along the conduit system, to the spraying head and then out of the spraying head in the form of a spray of liquid droplets or slurry. The aerosol spray device is preferably in the form of an aerosol can which is of a size suitable to be held in the hand and used in domestic situations.

The actuator generally comprises a body portion including a recess for accommodating the insert (as a part of the spraying head) including the bore and preferably a swirl chamber through which the liquid passes prior to reaching the bore. The recess is in communication with a valve stem communicating with a tail piece which in turn is in communication with a dip tube extending into the reservoir. Thus liquid can pass from the reservoir to the bore of the spraying head via conduit system comprising the dip tube, the tail piece, the valve stem, the actuator recess and the nozzle swirl chamber (if present).

It is possible to impart higher charges to the liquid droplets by choosing the material, shape and dimensions of the actuator, the insert in the actuator including the orifice from which the liquid is sprayed, the valve and the dip tube of an aerosol spray device and the characteristics of the composition which is to be sprayed, so that the required level of charge is generated as the composition is dispersed as droplets.

A number of characteristics of an aerosol spray device increase double layer charging and charge exchange between the liquid formulation and the surfaces of the components of the aerosol spray device. Such increases are brought about by factors which may increase the turbulence of the flow through the device, and increase the frequency and velocity of contact between the liquid and the internal surfaces of the container and valve and actuator.

The valve stem includes one or more orifices linking the valve stem with the tail piece and the tail piece includes one or more orifices linking the tail piece with the dip tube and the nature of these orifices and the diameter of the dip tube influence the charge given to the liquid. More particularly, the smaller the size of the or each stem orifice and the fewer the stem orifices, the greater is the contact area between the valve stem and the liquid and hence the greater is the charge in the liquid. An arrangement comprising a tail piece orifice in the housing of 0.65 mm and a reduced number of holes in the stem, for example 2×0.50 mm increases charge levels during spraying. However, as a corollary the flow rate of the liquid is restricted. Similar considerations apply to the tail piece orifice(s) and the diameter of the dip tube, a narrow dip tube of, for example, about 1.27 mm internal diameter, increases the charge levels on the liquid.

We have found that the degree of turbulence experienced by the liquid as it flows through the spray device influences the charge on the liquid droplets leaving the spraying head. The turbulence is able to dissipate the electrical charge of the double layer, that forms at the liquid/apparatus interface, more effectively within the bulk of the liquid thereby encouraging further electron transfer between the liquid and apparatus.

The swirl chamber, if present, subjects the liquid to turbulence and thereby increases the charge of the liquid. The geometry of the swirl chamber has a marked influence on the charge developed in the liquid. The swirl chamber generally comprises a plurality of input channels which feed the liquid to a central area and thence to the spraying head bore.

The apparatus may also include a vapour phase tap and the turbulence is also influenced by the size of the vapour tap. A vapour tap is quite conventional in aerosol spraying apparatus and it comprises an orifice enabling the gas pressure to act directly on the liquid in the conduit system linking the reservoir and the spraying head bore. The orifice may, for example, be provided in the tail piece of the valve assembly. Generally, the larger this orifice, of for example about 0.76 mm or larger the greater the turbulence produced and the greater the charge developed in the liquid.

Other factors which have an influence on the magnitude of the charge generated in the liquid are the materials used to form the parts of the apparatus which contact the liquid as it is being transported from the reservoir to the spraying head and the electrical, physical and chemical properties of the liquid being sprayed. More particularly, a greater charge can be imparted to the liquid droplets if there is a large separation of electron energy between the material and the liquid. Materials such as nylon, acetal, polyester, polyvinylchoride and polypropylene tend to increase the charge levels.

Further, the liquid being sprayed needs to be sufficiently electrically conductive as to be able to support an electrostatic charge whilst not being so conductive that the charge dissipates too quickly.

In addition, there may be other methods for disrupting the electrical double layer which will enhance the charging further by dissipating it into the bulk of the liquid.

Whilst not wishing to be limited by theory, it seems that another factor that may influence the magnitude of the charge is any vibration created during the liquid flow from the reservoir up to and including the bore in the spraying head.

Furthermore, in addition to or as a replacement of the swirl chamber, the actuator may include a mechanical break up device which breaks up the liquid composition and thereby promotes additional charging of the liquid composition.

Accordingly, in a still further aspect the present invention provides an aerosol spray device of the above type which further comprises a mechanical break up device provided in the actuator adjacent to the insert and promoting break up of the liquid composition.

In this embodiment of the aerosol spray device the break up device preferably comprises a circular disk having generally radially extending grooves in one surface connecting with an orifice which in turn connects with the orifice in the insert in the actuator.

The actuator insert of the aerosol spray device may be formed from a conducting, insulating, semiconducting or static-dissipative material.

By making use of the above factors, it is possible to ensure that the droplets produced have a charge/mass value of at least +/−$1\times10^{-4}$ C/kg and, as a consequence, the spray produced causes the droplets to travel further and cover a wider area than is conventionally the case. Moreover, because of their high charge, the droplets are readily attracted to any other particle. Thus, they quickly become attached to airborne particles or objects (e.g. flying insects).

Some of the aforementioned factors influencing the charge developed on the droplets also have the affect of reducing the flow rate of the liquid. However, by careful balancing of the factors, charge/ mass values of at least +/−$1\times10^{-4}$ C/kg and liquid flow rates of at least 0.5 grams per second (and preferably at least 1 gram per second and more preferably 2 gram per second) can be readily achieved, as described herein.

The liquid droplets sprayed from the aerosol spray device will generally have a range of average droplets sizes in the range of from 5 to 100 micrometers, with a peak of droplets of about 40 micrometers.

The improved targeting of droplets of an insecticidal composition onto flying insects is likely to offer two important advantages over conventional systems. First, the knock-down rate is likely to be improved since more insecticide actually alights on each insect in a given time period. Secondly, current knock-down rates may be maintained with a lower level of active ingredient in the insecticide product.

BRIEF DESCRIPTION OF THE DRAWINGS

In order that the invention may be more readily understood reference will now be made to the accompanying drawings, in which:

FIGS. 6.1 to 6.9 show different configurations of the bore of the spraying head shown in FIG. 3 when viewed in the direction A;

FIGS. 7.1 to 7.30 show further different configurations of the bore of the spraying head shown in FIG. 3 when viewed in the direction A;

FIGS. 9.1 to 9.8 show different configurations of the swirl chamber of the spraying head of FIG. 3 when viewed in the direction B;

DETAILED DISCLOSURE

Figure 1:
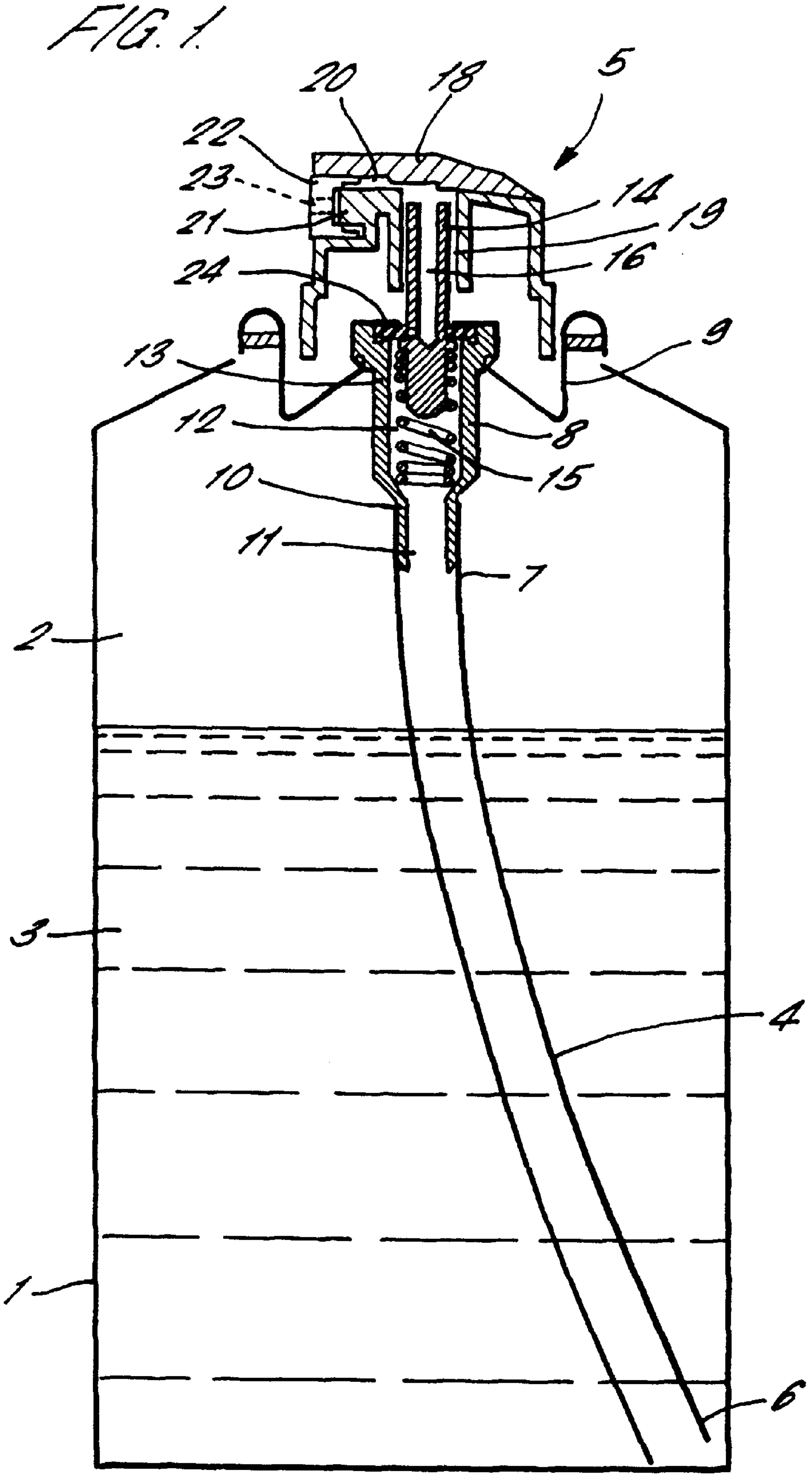
FIG. 1 is a diagrammatic cross section through an aerosol spray device embodying the invention.
Figure 2:
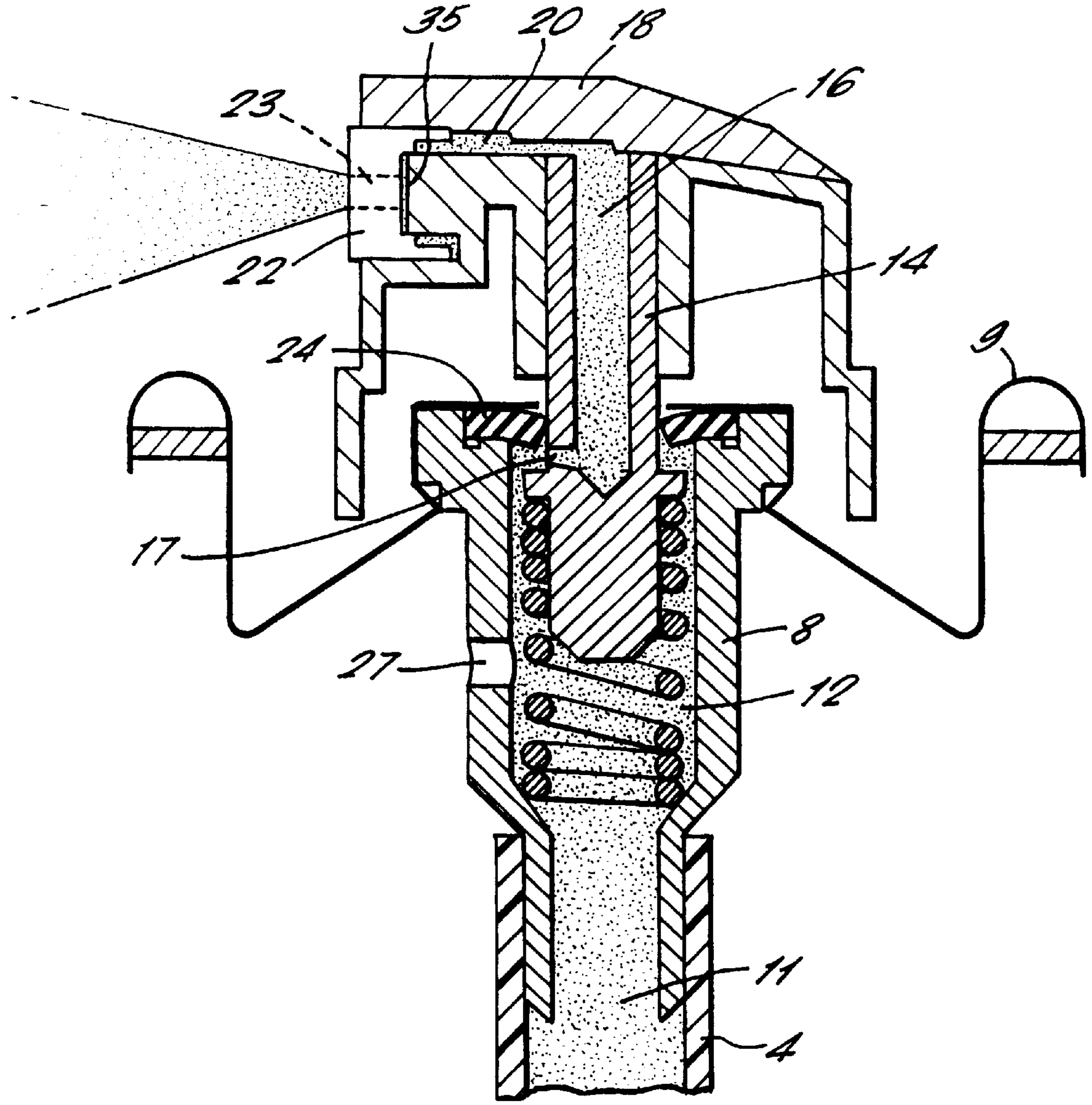
FIG. 2 is a cross section through the valve assembly of FIG. 1 illustrating some of the components in greater detail.

Referring to FIGS. 1 and 2, a spraying apparatus in accordance with the invention, of the aerosol type is shown. It comprises a can 1, formed of aluminium or lacquered or unlacquered tin plate or the like in conventional manner, defining a reservoir 2 for a liquid 3 having a conductivity such that droplets of the liquid can carry an electrostatic charge. Also located in the can is a gas under pressure which is capable of forcing the liquid 3 out of the can 1 via a conduit system comprising a dip tube 4 and a valve and actuator assembly 5. The dip tube 4 includes one end 6 which terminates at a bottom peripheral part of the can 1 and another end 7 which is connected to a tail piece 8 of the valve assembly. The tail piece 8 is secured by a mounting assembly 9 fitted in an opening in the top of the can and includes a lower portion 10 defining a tail piece orifice 11 to which end 7 of the dip tube 4 is connected. The tail piece includes a bore 12 of relatively narrow diameter at lower portion 11 and a relatively wider diameter at its upper portion 13. The valve assembly also includes a stem pipe 14 mounted within the bore 12 of the tail piece and arranged to be axially displaced within the bore 12 against the action of spring 15. The valve stem 14 includes an internal bore 16 having one or more lateral openings (stem holes) 17 (see FIG. 2).

The valve assembly includes an actuator 18 having a central bore 19 which accommodates the valve stem 14 such that the bore 16 of the stem pipe 14 is in communication with bore 19 of the actuator. A passage 20 in the actuator extending perpendicularly to the bore 19 links the bore 19 with a recess including a post 21 on which is mounted a spraying head in the form of an insert 22 including a bore 23 which is in communication with the passage 20.

A ring 24 of elastomeric material is provided between the outer surface of the valve stem 14 and, ordinarily, this sealing ring closes the lateral opening 17 in the valve stem 14. The construction of the valve assembly is such that when the actuator 18 is manually depressed, it urges the valve stem 14 downwards against the action of the spring 15 as shown in FIG. 2 so that the sealing ring 24 no longer closes the lateral opening 17. In this disposition, a path is provided from the reservoir 2 to the bore 23 of the spraying head so that liquid can be forced, under the pressure of the gas in the can, to the spraying head via a conduit system comprising the dip tube 4, the tail piece bore 12, the valve stem bore 16, the actuator bore 19, and the passage 20.

An orifice 27 (not shown in FIG. 1) is provided in the wall of the tail piece 8 and constitutes a vapour phase tap whereby the gas pressure in the reservoir 2 can act directly on the liquid flowing through the valve assembly. This increases the turbulence of the liquid. It has been found that an increased charge is provided if the diameter of the orifice 27 is at least 0.76 mm.

Preferably the lateral opening 17 linking the valve stem bore 16 to the tail piece bore 12 is in the form of 2 orifices each having a diameter of not more than 0.51 mm to enhance electrostatic charge generation. Further, the diameter of the dip tube 4 is preferably as small as possible, for example 1.2 mm, in order to increase the charge imparted to the liquid. Also, charge generation is enhanced if the diameter of the tail piece orifice 11 is as small as possible e.g. not more than about 0.6 mm.

Figure 3:
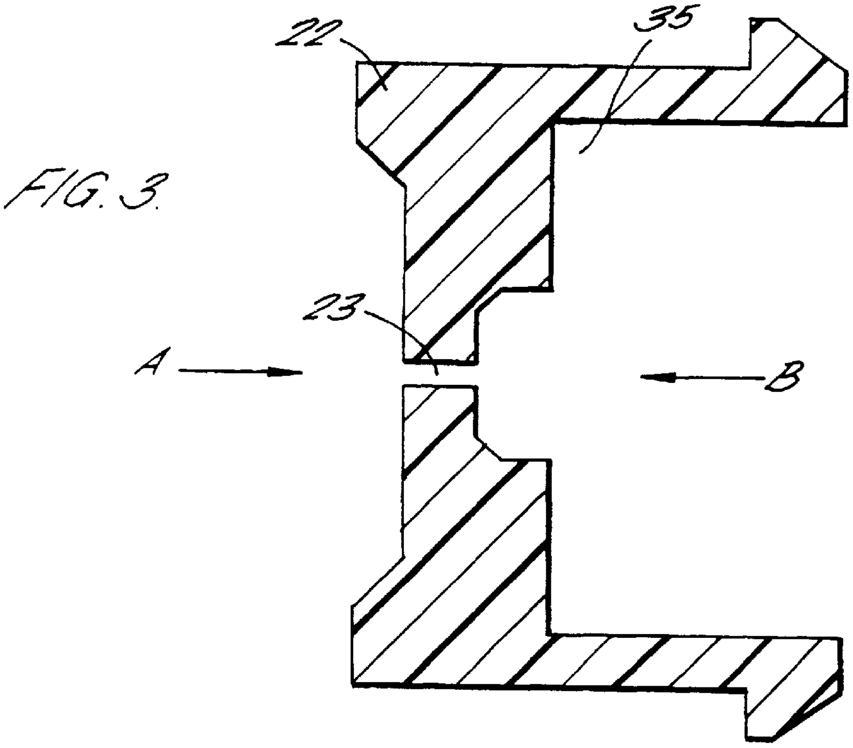
FIG. 3 is a cross section through the actuator insert of the assembly of FIG. 1.

Referring now to FIG. 3, there is shown on an increased scale, a cross section through the actuator insert of the apparatus of FIGS. 1 and 2.

Figure 4:
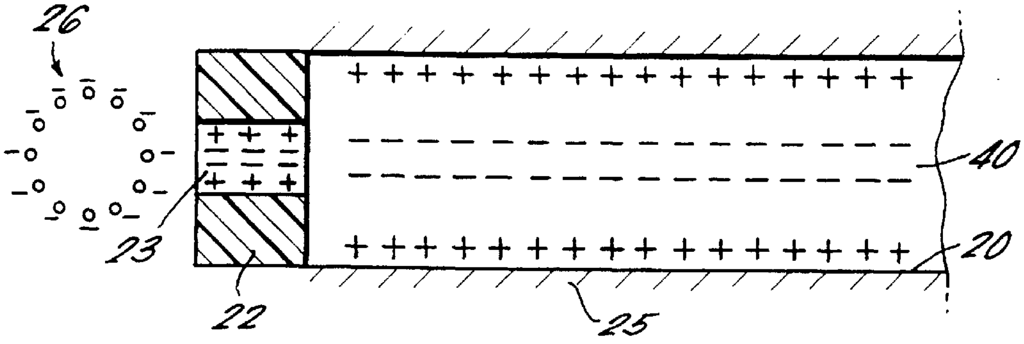
FIG. 4 is a schematic side view of part of the actuator insert to a larger scale illustrating the principle of double layer charging.

With reference to FIG. 4, as the liquid 3 flows through the channel 20, double layer charging occurs in the liquid 3 and on the surrounding body 25. Charge of one polarity accumulates in the liquid and charge of the opposite polarity accumulates on the body 25. This is the principle of double layer charging. As the liquid emerges from the bore 23 the charge in the liquid 3 is separated or sheared from the charge on the body 25. On emerging from the orifice the liquid is converted into droplets 26 and each of these droplets is charged to a polarity in accordance with the charge separation occurring.

The magnitude of the charge in the liquid droplets 26 as they emerge from the bore 23 can be varied by varying the parameters of some of the components in the aerosol spray device as described above. For example the dip tube 4 can have an inner diameter of between 1.27 mm and 3.00 mm and may be constructed from a polymeric material, such as polyethylene or polypropylene. The tail piece orifice 11 preferably has a diameter in the region of 0.64 mm, but may be larger or smaller. A smaller diameter tail piece orifice is preferred to a larger one.

The lateral openings 17 preferably have diameters in the region of 0.51 mm to 0.61 mm, but may be larger or smaller. Smaller diameter lateral openings are preferred to larger ones. A smaller number of lateral openings 17, in the region of two or three, is preferred, although any number of lateral openings may be present. The vapour phase tap 27 preferably has a diameter in the region of 0.76 mm to 1.17 mm, but it can alternatively be of any size or absent altogether. A larger diameter vapour phase tap is preferable to a smaller one.

The parameters of the actuator 18 are also important. The actuator insert 22 may be formed from any polymeric material, such as acetal, polyester, polyvinyl chloride (PVC), nylon or polypropylene. The bore outlet preferably has a diameter in the region of 0.3 mm to 0.9 mm, but can take any size.

The shape of the bore 23 is very important. In known types of aerosol spray devices the orifice is circular. It has been found that by making the orifice non-circular the charge to mass ratio of the liquid droplets emitted from the aerosol spray device is increased. Such an orifice increases the surface area of contact between the liquid and the internal surfaces of the insert 22 (see FIG. 4). This increases the double layer charging and charge separation which occur between the liquid 3 and the surfaces of the insert 22 (see FIG. 4). A nonround orifice may take the shape of a star, or a cross for example or may comprise any other number of channels. The channels may have pointed, rounded or squared off ends, and must be of a minimum width which is determined by the size of the narrowest channel which a typical liquid formulation needs to be sprayed successfully through the aerosol spray device.

FIG. 5 illustrates a number of different configurations for the bore 23. An example of a lobed bore is a four-lobed shape, 0.46 mm in maximum dimension, each lobe being formed from a semi-circle with a radius of 0.115 mm. This bore is illustrated in FIG. 5(*a*). The bore described has the same cross sectional area as a round bore of 0.205 mm radius, but the perimeter is 14% greater and the L/a ratio where L is measured in mm and a is measured in $mm^2$ is greater than 11. A greater charge to mass ratio is achieved when the liquid formulation of a domestic aerosol insecticidal spray is sprayed through the insert from an aerosol spray device. For example, when using the domestic aerosol insecticide "Mortein Ultra Low Allergenic" (Manufactured by Reckitt and Colman, Australia) the charge to mass ratio is raised from $-5.7\times10^{-5}$ C/kg with the 0.41 mm diameter round orifice insert to $-1.8\times10^{-4}$ C/kg with the 0.46 mm four lobed insert illustrated in FIG. 5(*a*). It will be appreciated that the length of the passage in the bore 23 through which the liquid passes is small in comparison with the perimeter of the orifice.

FIG. 5(*b*) illustrates two different sized orifices for the actuator insert each of which has three equally spaced rectangular channels to increase the perimeter area of contact between the charged liquid and the internal surface of the bore. FIG. 5(*c*) illustrates two different sized bores each of which has four equally spaced rectangular channels. FIG. 5(*d*) illustrates a single bore which has four equally spaced circular channels. In accordance with preferred embodiments of the invention, the bore 23 has one of a plurality of particular configurations. Examples of such bores are shown in FIGS. 6.1 to 6.9 and FIGS. 7.1 to 7.30. In these Figures, the apertures of the bore are denoted by reference numeral 31 and the aperture-defining portions of the bore are denoted by reference numeral 30. In each case the total peripheral length of the aperture-defining portions at the bore outlet is denoted by L in mm and a in $mm^2$ is the total area of the aperture at the bore outlet and the values for L and a are as indicated on the Figures. In most cases, L/a exceeds 10 and this condition has been found to be particularly conducive to charge development because it signifies an increased contact area between the spraying head and the liquid passing therethrough.

It can be seen that many different configurations can be adopted in order to produce a high L/a ratio without the cross-sectional area a being reduced to a value which would allow only low liquid flow rates. Thus, for example it is possible to use spraying head bore configurations (i) wherein the bore outlet comprises a plurality of segment-like apertures (with or without a central aperture) as illustrated in FIGS. 6.1 to 6.7; FIGS. 7.1 to 7.5; and FIGS. 7.12, 7.15, 7.16, 7.17, 7.19, 7.20, 7.25 and 7.30; (ii) wherein the outlet compartment a plurality of sector-like apertures as illustrated in FIGS. 7.6 to 7.8 and FIG. 7.13; (iii) wherein the apertures together form an outlet in the form of a grill or grid as illustrated in FIGS. 7.9 to 7.11 and 7.22; (iv) wherein the outlet is generally cruciform as illustrated in FIGS. 6.8 and 6.9, FIGS. 7.21, 7.28 and 7.29; (v) wherein the apertures together define an outlet in the form of concentric rings as illustrated in FIG. 7.14; and combinations of these configurations such as illustrated in FIGS. 7.18, 7.21, 7.24, 7.27, 7.28 and 7.29. Particularly preferred are spraying head configurations wherein a tongue like portion protrudes into the liquid flow stream and can be vibrated thereby as illustrated in FIGS. 7.10, 7.13, 7.14, 7.23 and 7.26. This vibrational property may enhance electrical charging due to charge dissipation from the electrical double layers into the bulk of the liquid.

Figure 8:
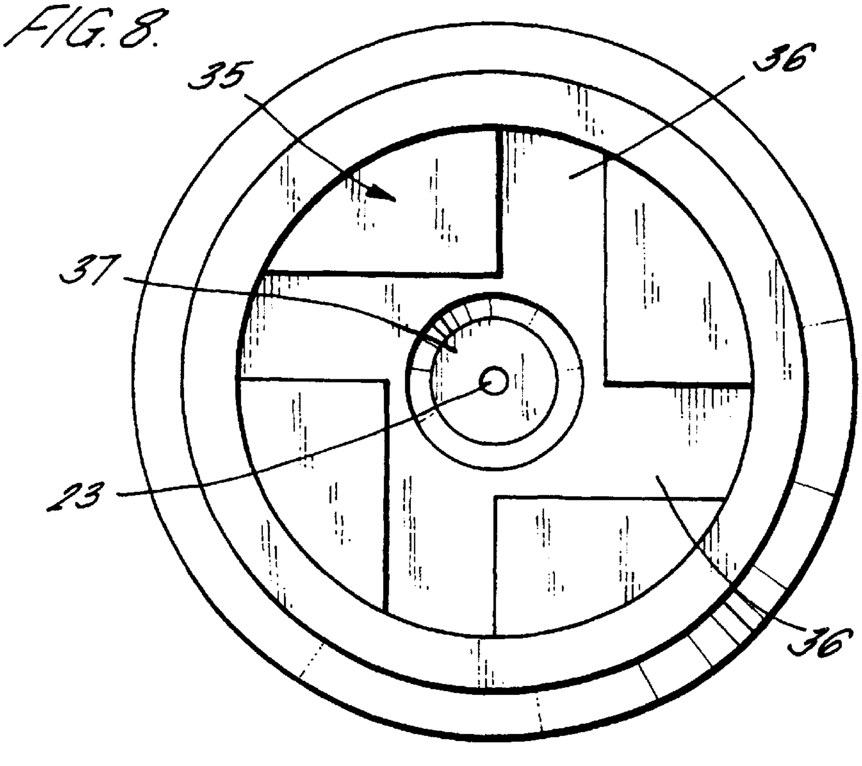
FIG. 8 shows a first configuration of the swirl chamber of the spraying head shown in FIG. 3 when viewed in the direction B.

Referring now to FIG. 8, there is shown a plan view of one possible configuration of swirl chamber 35 of the spraying head 22. The swirl chamber includes 4 lateral channels 36 equally spaced and tangential to a central area 37 surrounding the bore 23. In use, the liquid driven from the reservoir 2 by the gas under pressure travels along passage 20 and strikes the channels 36 normal to the longitudinal axis of the channels. The arrangement of the channels is such that the liquid tends to follow a circular motion prior to entering the central area 37 and thence the bore 23. As a consequence, the liquid is subjected to substantial turbulence which enhances the electrostatic charge in the liquid.

FIG. 9 illustrates different configurations for the swirl chamber 35. In each cases, the swirl chamber includes two or more lateral channels 36 for feeding the liquid tangentially to the central area 37 so as to impart turbulence to the liquid flowing therethrough.

Figure 10A:
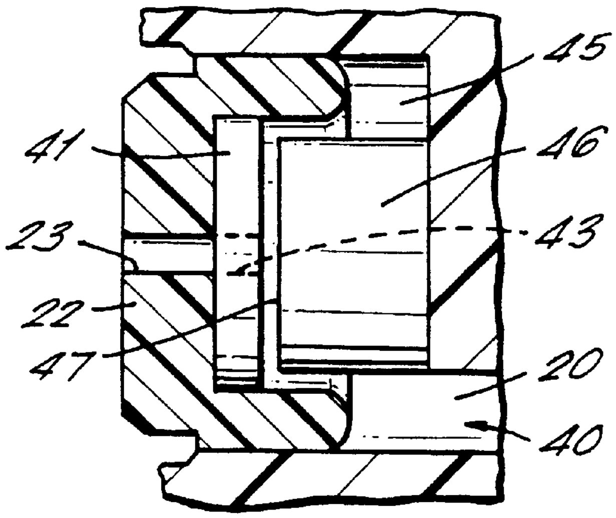
FIG. 10A is a side view partly in section on an enlarged scale of an alternative version of an actuator showing the insert and a mechanical break up device.
Figure 10B:
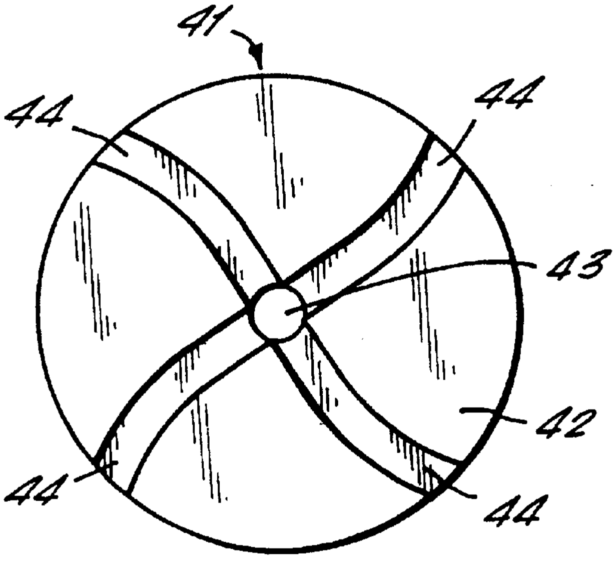
FIG. 10B is an end view of the mechanical break up device illustrated in FIG. 8A.

FIGS. 10A and 10B illustrate a mechanical break up device 41 which may be used in combination with the insert 22 to increase the charge on the liquid droplets. The device is illustrated in FIG. 10B and comprises a circular disk 42 having a central orifice 43 and four grooves 44 in one surface. The grooves 44 are curved and extend generally radially as illustrated and connect with the central orifice 43. There can be any number of the grooves 44 and the orifice 43 may not be positioned exactly centrally.

FIG. 10A illustrates an alternative version of an actuator which includes the break up device 41. The channel 23 is connected to an annular chamber 45 with a central boss 46 having a front face 47. The break up device 41 is attached to the inner surface of the insert 22 with its radially extending grooves 44 facing the boss 46. The liquid 40 passing along the channel 20 enters into the annular chamber 45 around the central boss 46 and then flows radially inwards over the front face 47. In doing so it passes over the face of the break up device which is formed with the radially extending grooves 44 and flows along the grooves. This causes break up of the liquid and increases the charge in the liquid. The additionally charged liquid flows through the orifice 43 in the device 41 onto the orifice 23 in the insert 24.

Figure 5A:
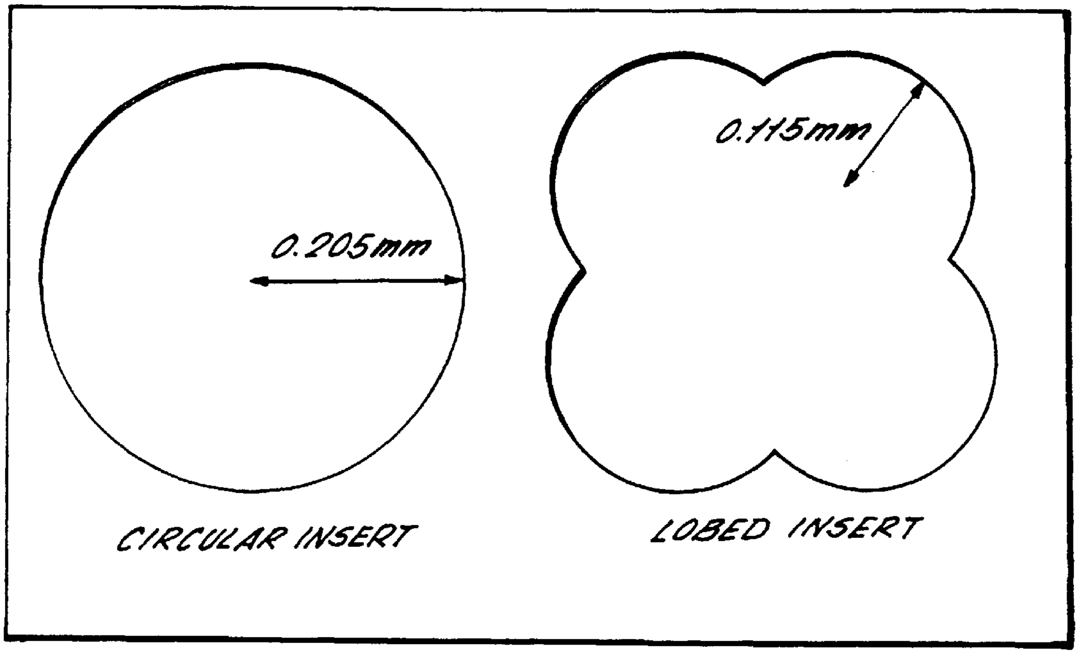
FIG. 5 is an end view from the outside of the orifice in the actuator insert illustrating a number of alternative configurations.
Figure 5B:
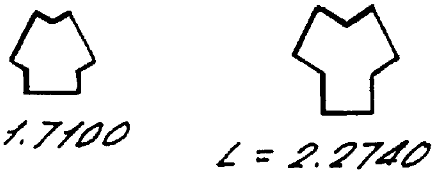
Figure 5C:
Figure 5D:
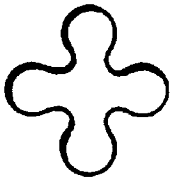

In one embodiment of the invention the charge to mass ratio of the liquid droplets of an insecticidal product "Mortein Ultra Low Allergenic" (Reckitt and Colman, Australia) sprayed from an aerosol spray device was enhanced from $-3\times10^{-5}$ C/kg to $-3\times10^{-4}$ C/kg by using a mechanical break up device as illustrated in FIG. 10A and 10B with an orifice 23 having a lobed structure as illustrated in FIG. 5*a* and as described above. This was in conjunction with other components of the spray device having the following parameters: a polyethylene dip tube 4 of 3.00 mm diameter, a tailpiece orifice 11 of 1.27 mm diameter, four lateral openings 17 of 0.61 mm diameter and a vapour tap orifice 27 of 0.76 mm diameter.

The present invention will be further described with reference to the following Examples which illustrate how an increase in the charge on the liquid droplets lead to enhanced targeting of flying insects

EXAMPLE 1

A fluorometric assay was designed. *Calliphora erythrocephala* flies were freshly killed by freezing for one hour. They were then removed from the freezer and left for two hours to reach room temperature again. Each fly was weighed and then individually pinned to a nylon rod by a fine entomological pin (E3) passing through the side of the thorax. A standard aerosol spray can of Mortein Ultra Low Allergenic insecticide (Reckitt & Colman, Australia), with 0.5% "Fluorescein" (Acid Yellow 73, Aldrich) added to the formulation, was weighed, well shaken and placed at a distance of 1.8 meters from the fly in an electrically isolated plastic holder. The can was aligned so that the fly was centrally placed in the stream of droplets of the product that could be sprayed from the aerosol spray can.

A two second spray of droplets of the product was emitted onto the fly. The fly was immediately removed from the pin and placed in a vial containing 5 ml of cold phosphate buffer solution (pH 6.8, 0.1 M $Na_2PO_4$+$NaH_2PO_4H_2O$). The can was reweighed to calculate the quantity of product emitted during the experiment. The vial containing the fly was sealed, shaken and stored in cold, dark conditions for 24 hours, after which time the fly was gently removed with clean dry tweezers. The vial of buffer solution containing the fluorescent tracer washed from the fly was kept dark and cold in the refrigerator until analysis could take place. Eleven replicate operations were performed in this way for the standard aerosol insecticide product.

The charge level on the droplets emitted from the aerosol spray can was then artificially raised to a charge to mass ratio level of approximately $1\times10^{-4}$ C/kg by applying a voltage to the seam of the can from a high voltage power supply. The above described experiment was repeated 15 times with −10 kV applied to the can and then 12 times with +10 kV applied to the can.

To perform the analysis of the contents of the vials a 3 ml aliquot was taken from each vial and the volume of fluorescent tracer in the solution was determined by analysis in a Perkin-Elmer LS3-R fluorometer operating at 490 nm excitation wavelength and 515 nm emission wavelength. The fluorometer was blanked with a sample of buffer solution in which an unsprayed fly had been placed for 24 hours. A standard calibration curve was obtained by applying known quantities of insecticide formulation to a fly by micro applicator and placing the fly in 5 ml of buffer solution for 24 hours.

Figure 11:
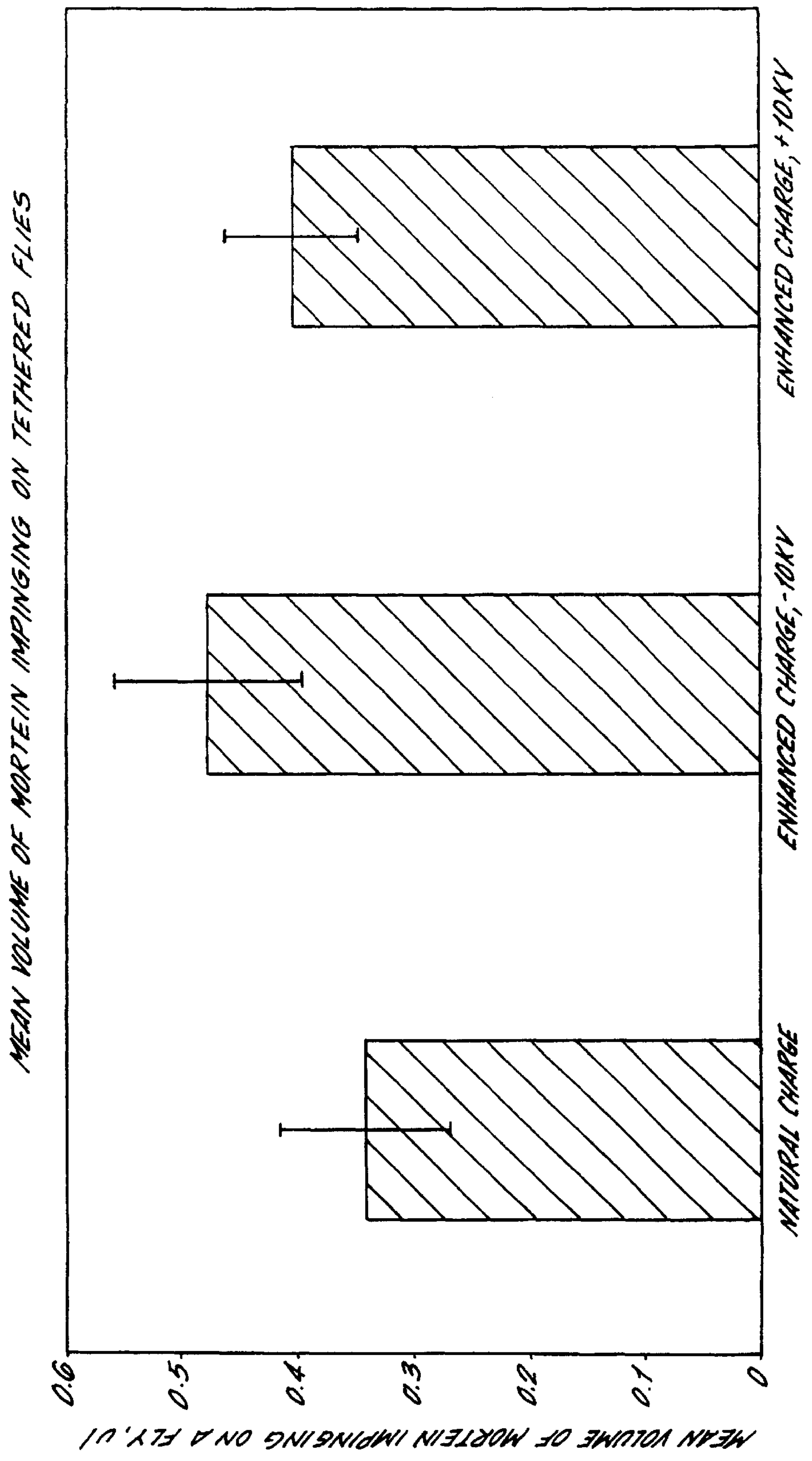
FIG. 11 is a diagram illustrating the volume of an insecticide falling on tethered flies.

The mean results of the analysis are given in FIG. 11 and show that raising the charge to mass ratio of the insecticide product from $-3\times10^{-5}$ C/kg to $-2\times10^{-4}$ C/kg (by applying −10 kV to the aerosol spray can) increases the mean volume of product alighting on a fly from 0.34 $\mu$l to 0.47 $\mu$l, an increase of 35%. Similarly, when the charge to mass ratio is raised to $+3\times10^{-4}$ C/kg (by applying +10 kV to the aerosol spray can) the mean volume of insecticide product alighting on the fly is raised to 0.40 $\mu$l, an increase of 18%.

The results as illustrated in FIG. 11, show 95% confidence levels.

The charge to mass ratio on the insecticide droplets can alternatively be raised by modifications to the aerosol spray device components in accordance with the invention. A mean charge to mass ratio of $-3\times10^{-4}$ C/kg can be achieved on Mortein Ultra Low Allergenic insecticide (Reckitt & Colman, Australia) when the standard actuator is replaced with a similar style actuator composed of a 0.46 mm insert orifice with a mechanical break-up device on the internal surface as described with reference to FIGS. 10A and 10B. The standard actuator is a two-piece spray cap actuator without an insert. This charge to mass ratio is sufficient to effect the 38% increase in targeting demonstrated by application of the charge directly to the seam of the can.

EXAMPLE 2

Enhanced Knockdown of *Musca domestica*

Knock-down experiments were done in a British standard size fly room measuring 400 cm long by 290 cm wide by 250 cm high. The room was evenly lit with fluorescent lights, and maintained at a temperature of 22.0±3.0° C. 25 male and 25 female *Musca domestica* flies of between 3 and 7 days post emergence were used for all of the tests. An aerosol spray can of domestic insecticide was placed in an electrically isolated plastic holder with a brass screw contacting an area of the can from which the paint had been removed. The insecticide product was sprayed for 1±0.1 second by depressing a lever of the can holder.

After a period of 1 second the flies were released into the plume of insecticide at a distance of 180 cm from the can. The number of flies incapable of co-ordinated movement were counted at 0.5, 1.5, 2.0, 2.5, 3.0, 4.0, 6.0, 8.0 and 12.0 minutes after the spray of insecticide. A minimum of 5 replicates were performed for each variant. The results were pooled and analysed by probit analysis to provide a $KDT_{50}$ (time to knock down 50% of the flies) value.

The insecticide product used for these experiments was 'Black Flag' (Reckitt and Colman Products, Australia). Two treatments were investigated, these being the effect of normal aerosol insecticide, and the same aerosol insecticide with −10 kV applied to the can. The standard product has a charge to mass ratio of about $-1\times10^{-8}$ C/kg, while applying −10 kV to the can during spraying raised this to $-1\times10^{-4}$ C kg. High voltage was applied in the same way as described in the previous example. The replicates were performed for both treatments. The results are shown in FIG. 12.

Figure 12:
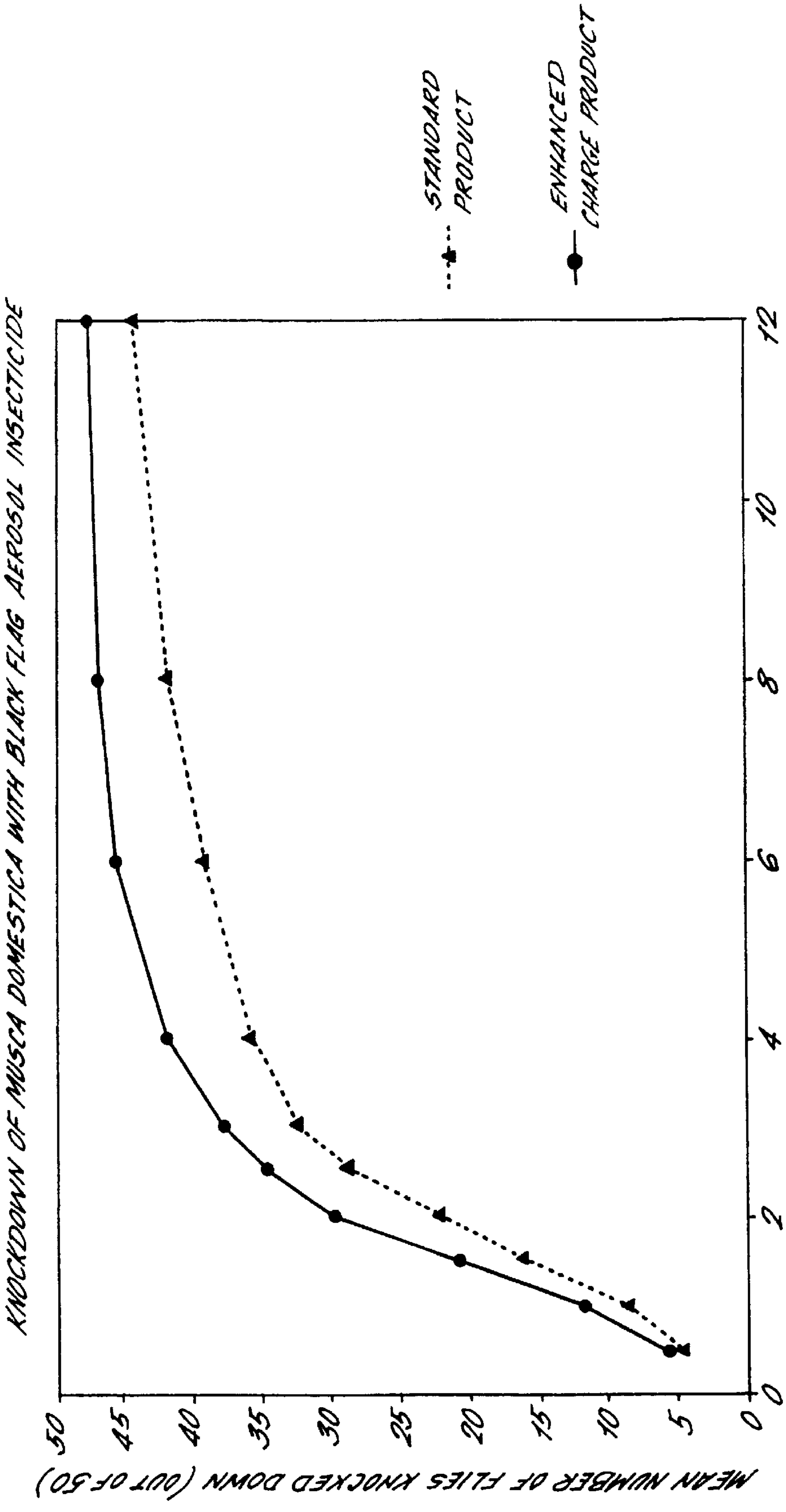
FIG. 12 is a graph illustrating how the knock down of flies by insecticide is increased as the charge on droplets of the insecticide is increased.

The graph of FIG. 12 shows that liquid droplets of Black Flag insecticide with an enhanced charge to mass ratio has a faster rate of knock down than the standard product. Probit analysis gives the $KDT_{50}$ for the standard product as 2 minutes 22 seconds, and 1 minute 41 seconds for the enhanced charge product.

Although the invention has been specifically described above as applied to a liquid insecticidal product in an aerosol can, the invention may equally be used with other insecticidal products such as a slurry or an emulsion.

EXAMPLE 3

An insecticidal composition was prepared from the following components:

| | % by weight |
|---|---|
| Liquefied petroleum gas | 40% |
| $C_{13}$ hydrocarbon solvent | 8% |
| Water | 50% |
| Polyglycerol oleate ester | 1% |
| Bioallethrin, bioresmethin | 1% |

The composition was introduced into tinplate aerosol cans having valve assemblies comprising a 3.00 mm polypropylene diptube, 1.27 mm housing orifice, 0.64 mm vapour phase tap and 2×0.61 mm stem holes. Two sprays were compared, one with a single-piece actuator with a 0.85 mm diameter circular orifice and one with a two piece button-style actuator with an insert as shown in FIG. 7.1 of the accompanying drawings. The spray characteristics achieved with the two actuators were very similar. The charge-to-mass ratio of the insecticidal formulation achieved with the 0.85 mm circular orifice was $-2.52\times10^{-5}$ C/kg, and with the orifice in FIG. 7.1 the charge-to-mass ratio was $-1.06\times10^{-4}$ C/kg.

Knockdown and mortality of house flies, *Musca domestica*, was compared for the two insecticide variables, according to the CERIT (Centre for Entomological Research and Insecticide Technology) space spray protocol CE/HF-HM/FIK 1.0 01/08/96. The space spray protocol was designed to simulate the use of domestic pressure packed insecticides in which the room is sprayed in general, rather than insects being targeted. A microcomputer controlled the key function of the procedure, including calibration and spraying of cans, release of insects, timing of knockdown counts, exhaustion of the chamber and storage of data.

The test chamber was 3.82 m long, 3.33 m wide and 2.47 m high, and the lower third of the walls sloped inwards to reduce the floor area on which the insects fell. Each replicate used at least 50 healthy house flies, *Musca domestica*, at 3–7 days post emergence and of a mixed sex ratio, (approximately 1:1).

The delivery rate of each insecticide dispenser was calibrated by actuating for approximately 2 seconds, and dividing the mass sprayed during this period by the precise duration of the spray. This operation was automatically controlled by the computer. The dispenser was positioned in the test chamber, adjacent to the door, and centrally in the width of the room. The actuator of the dispenser was 220 mm from the wall and 700 mm from the ceiling. The insects were released from a central location in the width of the chamber, 0.7 m above the floor and 3.0 m in front of the actuator of the dispenser. 2.0±0.2 grams of insecticide formulation were sprayed into the room, and the flies released 10.0±0.1 seconds after completion of the spray. Knockdown was evaluated visually from outside the test chamber via a viewing window, at 1, 2, 3, 4, 5, 6, 8, 12, 16 and 20 minutes. The operator did not enter the chamber during the experiment. A minimum of 5 replicates were performed for each variable. The order of testing was randomised.

Following each test the insects were carefully collected into recovery chambers. Insects which had been knocked down were gently swept using a soft brush, while any still in flight were caught using a butterfly net. The flies were held at 25.0±2.0° for 24 hours, and supplied with food and water. After this time mortality was recorded.

The test chamber was evacuated after each test for at least 15 minutes by a ceiling vent pumping air at approximately 10 cubic meters per minute. To check for contamination of the test chamber a control test was performed following the final test of each day. This was conducted by repeating the above procedure without spraying any aerosol insecticide into the chamber. The room was considered to be contaminated if more than 10% of the insects were knocked down at the end of the test, and in this case all results performed during the day were discarded. The chamber was subsequently cleaned and re-tested for contamination. The results of any individual test were also discarded if the specified quantity of formulation was exceeded.

Figure 13:
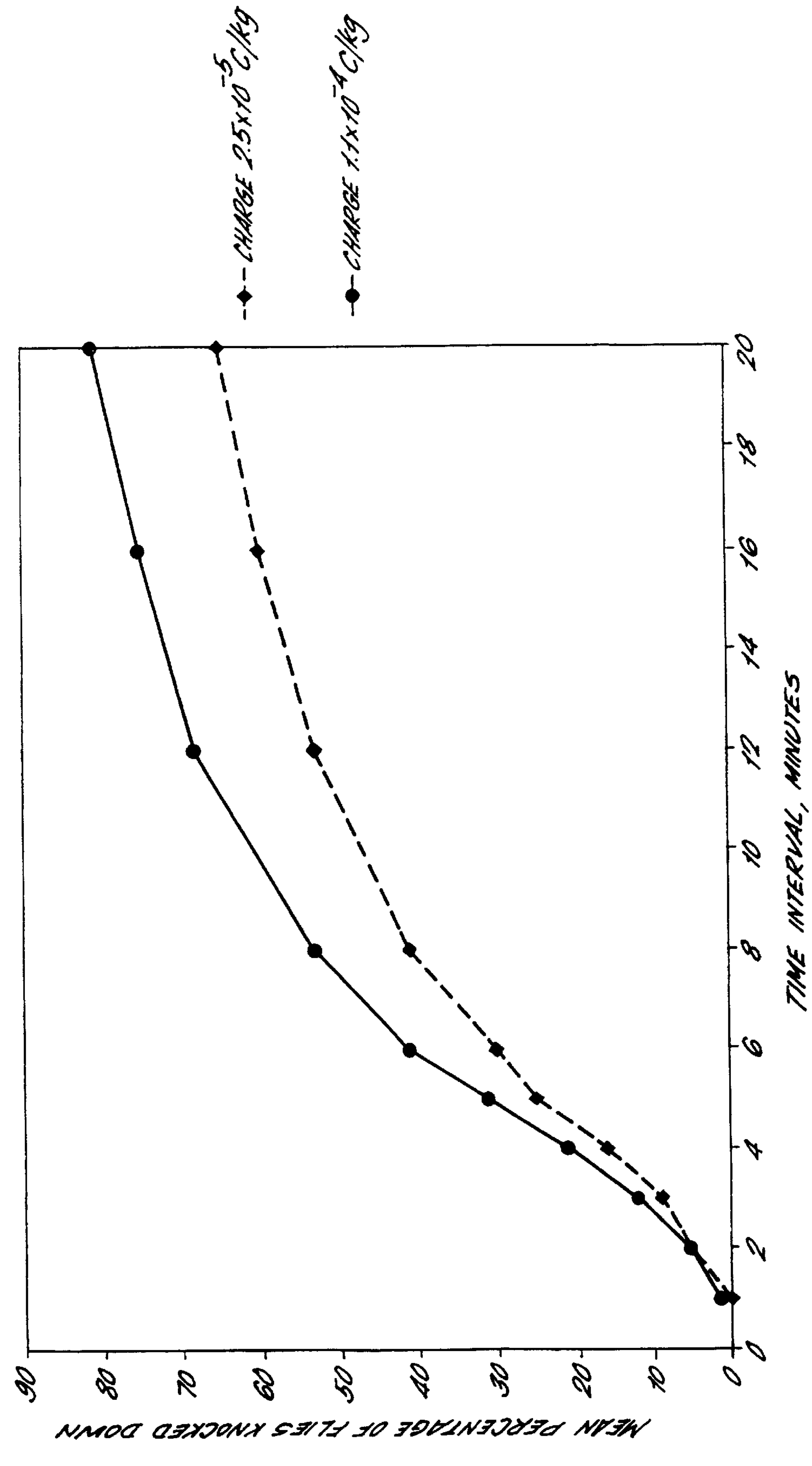
FIG. 13 is a graph illustrating how the knock down of flies is increased using an aerosol spray with a spray head bore as illustrated in FIG. 7.1, as compared to a circular bore which gives the same spray rate.

The results are shown in FIG. 13 and are based on the average of 5 replicates. These results indicate that knockdown of house flies is enhanced when the charge-to-mass ratio of the insecticide droplets is $-1.06\times10^{-4}$ C/kg, as compared to $-2.52\times10^{-5}$ C/kg. Probit analysis gives the $KDT_{50}$ for the insecticide with a charge-to-mass ratio of $-2.52\times10^{-5}$ C/kg as 701 seconds, and the $KDT_{50}$ for the insecticide with a charge-to-mass ratio of $-1.06\times10^{-4}$ C/kg as 465 seconds. Parametric analysis of the mean $KDT_{50}$ shows that the faster knockdown of the highly charged insecticide is highly statistically significant.

What is claimed is:

1. A method of killing flying insects which method comprises spraying into the air in which insects are flying liquid droplets of an insecticidal composition, a unipolar charge being imparted to said droplets by double layer charging and charge separation during spraying, the unipolar charge being at a level such that said droplets have a charge to mass ratio of at least $+/-1\times10^{-4}$ C/kg.

2. A method as claimed in claim 1 wherein the insecticidal composition is sprayed from an aerosol spray device which is mechanically operated under pressure.

3. A method as claimed in claim 2 wherein the aerosol spray device is a domestic aerosol spray device.

4. A method as claimed in claim 2 wherein the insecticidal composition is a liquid or a slurry.

5. A method as claimed in claim 2 wherein the insecticidal composition is an emulsion.

6. A method as claimed in claim 2 wherein the liquid droplets have an average diameter in the range of from 5 to 100 $\mu$m.

7. A spray device which is capable of imparting by double layer charging and charge separation to liquid droplets of a composition sprayed therefrom a unipolar charge resulting in a charge to mass ratio of at least $+/-1\times10^{-4}$ C/kg, which spray device comprises:

i) reservoir for accommodating the liquid composition;

ii) a spraying head through which the liquid is expelled in the form of a spray of droplets; and iii) a conduit system for feeding the composition from the reservoir to the spraying head; wherein a) the spraying head has a bore through which the liquid is expelled from the device, the bore having an outlet having an L/a ratio of at least 10, where L is the length of the periphery defining the bore outlet in mm and a is the cross sectional area of the bore outlet in $mm^2$; and b) the device is constructed such that the droplets are expelled from the spraying head at a flow rate of at least 0.5 grams per second and have the aforementioned charge to mass ratio.

8. A spray device as claimed in claim 7 wherein the spraying head is an insert in an actuator.

9. A spray device as claimed in claim 8 wherein the L/a ratio is at least 12.

10. A spray device as claimed in claim 8 wherein the bore outlet has a tortuous periphery.

11. A spray device as claimed in claim 8 wherein the spraying head configuration is such that the bore outlet comprises a plurality of segment-like apertures.

12. A spray device as claimed in claim 8 wherein the bore outlet additionally comprises one or more central apertures.

13. A spray device as claimed in claim 8 wherein the spraying head configuration is such that the bore outlet comprises a plurality of sectors.

14. A spray device as claimed in claim 8 wherein the spraying head configuration is such that the bore outlet is in the form of a generally cruciform aperture.

15. A spray device as claimed in claim 8 wherein the spraying head configuration is such that the bore outlet comprises apertures in the form of concentric rings.

16. A spray device as claimed in claim 8 wherein the spraying head configuration is such that the bore outlet includes a tongue-like protrusion in the bore, the protrusion being capable of vibrating.

17. A spray device as claimed in claim 8 wherein the spraying head configuration is such that the bore outlet comprises a grill or grid.

18. A spray device which is capable of imparting by double layer charging and charge separation to liquid droplets of a composition sprayed therefrom a unipolar charge resulting in a charge to mass ratio of at least $+/-1\times10^{-4}$ C/kg, which spray device comprises:

i) a reservoir for accommodating the liquid composition;

ii) a spraying head through which the liquid is expelled in the form of a spray of droplets; and iii) a conduit system for feeding the composition from the reservoir to the spraying head; wherein a) the spraying head has a bore through which the liquid is expelled from the device, the bore having an outlet having a tortuous periphery and an L/a ratio of at least 8, where L is the length of the periphery defining the bore outlet in mm and a is the cross sectional area of the bore outlet in $mm^2$; and b) the device is constructed such that the droplets are expelled from the spraying head at a flow rate of at least 0.4 grams per second and have the aforementioned charge to mass ratio.

19. A spray device as claimed in claim 18 which is an aerosol spray device having a valve assembly additionally comprising iv) a valve stem mounted for rectilinear displacement with respect to a tail piece, and v) an actuator for displacing the valve stem between a closed first position and an open second position in which the valve stem is in communication with the tail piece, and in which the spraying head is located in the actuator in communication with the valve stem, and the conduit system comprises the valve stem, the tail piece and a dip tube connecting the tail piece to the reservoir, through which conduit system liquid is driven from the reservoir to a nozzle in the spraying head by gas under pressure in the reservoir.

20. An aerosol spray device as claimed in claim 19 wherein the spraying head includes a swirl chamber.

21. An aerosol spray device as claimed in claim 19 wherein an opening is provided in the valve stem for communication with the tail piece, said opening being in the form of two orifices each having a diameter in the range of from 0.51 mm to 0.61 mm.

22. An aerosol spray device as claimed in claim 19 wherein the tail piece includes an opening to enable gas in the reservoir to act directly on liquid in the tail piece, said opening being at least 0.76 mm in diameter.

23. An aerosol spray device as claimed in claim 19 wherein the dip tube is connected to an opening in the tail piece having a diameter of 0.64 mm or less.

24. An aerosol spray device as claimed in claim 19 further comprising a mechanical break-up device in the actuator which breaks up the liquid composition resulting in additional charging of the liquid droplets.

25. An aerosol spray device as claimed in claim 24 wherein the mechanical break-up device comprises a disk having generally radially extending grooves cooperating with surfaces in the actuator to force the liquid composition to flow through the grooves.

26. An aerosol spray device as claimed in claim 19 wherein the spraying head is formed from a polymeric material such as acetal, polyester, polyvinyl chloride, nylon or polypropylene.

27. An aerosol spray device which is capable of imparting by double layer charging and charge separation to liquid droplets of a composition sprayed therefrom a unipolar charge resulting in a charge to mass ratio of at least $+/-1\times 10^{-4}$ C/kg, which spray device comprises:

i) a reservoir for accommodating the liquid composition;

ii) a valve stem mounted for rectilinear displacement with respect to a tail piece;

iii) an actuator for displacing the valve stem between a closed first position and an open second position in which said valve stem is in communication with the tail piece;

iv) a spraying head located in the actuator in communication with the valve stem and through which the liquid is expelled in the form of droplets, said spraying head including a swirl chamber and a mechanical break-up device, and v) a conduit system for feeding the composition from the reservoir to the spraying head, said conduit system comprising the valve stem, the tail piece, and a dip tube connecting the tail piece to the reservoir, wherein a) the spraying head has a bore through which the liquid is expelled from the spray device, the bore having an outlet having a tortuous periphery and an L/a ratio of at least 8, where L is the length of the periphery defining the bore outlet in mm and a is the cross sectional area of the bore outlet in $mm^2$;

b) liquid is driven from the reservoir through the conduit system to a nozzle in the spraying bead by gas under pressure in the reservoir; and c) the spray device is constructed such that the droplets are expelled from the spraying head at a flow rate of at least 0.4 grams per second and have the aforementioned charge to mass ratio.

28. An aerosol spray device as claimed in claim 27 in which the L/a ratio is at least 10 and the flow rate of the expelled droplets is at least 0.5 grams per second.

* * * * *